United States Patent [19]

Pinkerton

[11] 3,789,807
[45] Feb. 5, 1974

[54] DUAL COMBUSTION PROCESS FOR AN INTERNAL COMBUSTION ENGINE

[76] Inventor: James David Pinkerton, 12689 Cometa Ave., Sylmar, Calif. 91342

[22] Filed: June 19, 1972

[21] Appl. No.: 264,201

[52] U.S. Cl....... 123/1 R, 123/59 EC, 123/119 CD, 60/13, 60/15, 60/274, 60/278
[51] Int. Cl.. F02b 75/12, F01k 27/00, F02m 25/06
[58] Field of Search......... 123/1 R, 59 EC, 119 CD; 60/13 N, 15, 278, 279, 280, 274

[56] References Cited
UNITED STATES PATENTS

| | | | |
|---|---|---|---|
| 3,513,929 | 5/1970 | Dae Sik Kim | 60/280 X |
| 2,113,601 | 4/1938 | Pratt | 123/1 |
| 2,113,602 | 4/1938 | Pratt | 123/1 |
| 2,196,228 | 4/1940 | Prescott | 60/15 |
| 3,306,033 | 2/1967 | Cornelius | 60/278 |
| 3,393,668 | 7/1968 | Milgram | 60/279 |
| 3,553,961 | 1/1971 | McReynolds | 60/274 X |

*Primary Examiner*—Al Lawrence Smith
*Attorney, Agent, or Firm*—Jay H. Quartz

[57] ABSTRACT

An internal combustion process in which fuel is twice combusted before leaving the system. Air is compressed in a low pressure cylinder with some of this compressed air being withdrawn and injected, with or without cooling, into a high pressure cylinder where it is further compressed and combusted with fuel in a highly fuel rich mixture. The exhaust gases from the high pressure cylinder are withdrawn from the latter and flowed into a reservoir chamber from which they are intermittently withdrawn and injected into the low pressure cylinder for mixture and combustion with the compressed air in the latter cylinder. The foregoing steps are repeated after the exhaust gases are purged from the low pressure cylinder.

22 Claims, 3 Drawing Figures

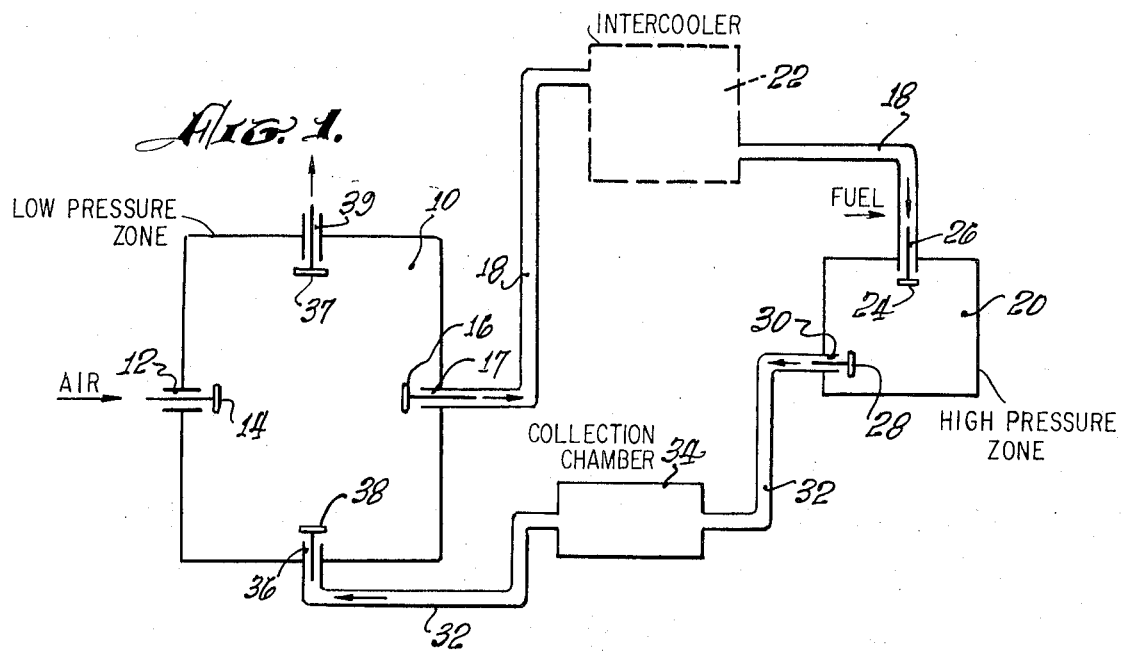
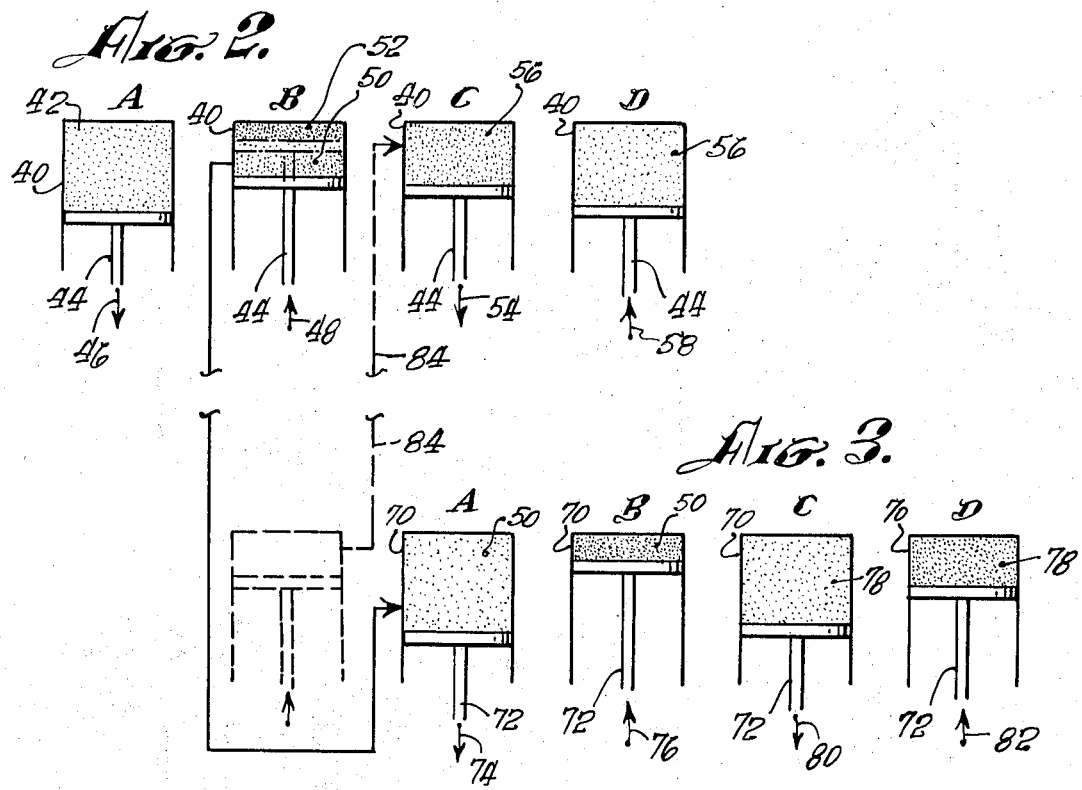

DUAL COMBUSTION PROCESS FOR AN INTERNAL COMBUSTION ENGINE

BACKGROUND OF THE INVENTION

This invention relates generally to internal combustion engines and, more particularly, to an internal combustion engine in which the fuel is twice combusted in different cylinders before being exhausted.

It is well known that internal combustion engines produce substantial amounts of pollutants, e.g., carbon monoxide, hydrocarbons and nitrogen oxides, which are exhausted from such engines to the atmosphere. This is particularly true of the present internal combustion engines which often employ compression ratios in excess of 10:1. The presence of these pollutants in the atmosphere leads to many respiratory problems as is well-recognized. This has made it necessary to reduce such harmful emissions as much as possible.

One attempt to reduce pollutants includes use of a crankcase "blow-by" pipe which recycles unburned gases reaching the crankcase by returning such gases to the inlet manifold to the cylinders. This method concerns only the small amount of gases escaping into the crankcase past the pistons; the exhaust gases are left unchanged. Furthermore, the recycled gases are merely re-subjected to the same combustion conditions with any and all shortcomings associated therewith.

Another method that is still primarily in the experimental stage is the use of units which are usually part of a vehicle's exhaust system and which function to oxidize carbon monoxide and unburned fuel by flowing air into the unit to combine with these combustion products in the presence or absence of a catalyst without further combustion. This method has several disadvantages. No useful work is obtained from this method. Additionally, it increases the back-pressure in the exhaust line so that scavenging of the cylinders is adversely affected with a resulting reduction in efficiency. Furthermore, the catalyst must be replaced periodically with its attendant cost.

The result of the various attempts to reduce pollutants is that there has been no major change in the internal combustion engine.

SUMMARY OF THE INVENTION

This invention is embodied in a process and apparatus which includes dual combustion of a fuel/air mixture and the harnessing of the energy produced by each combustion to obtain work with some of this work being used to perform the process.

More specifically, air is first compressed in a low pressure cylinder. Part of this compressed air is withdrawn from the low pressure cylinder before the end of the compression stroke in that cylinder and is fed (after being cooled in the case of a spark ignition) into a high pressure cylinder of substantially smaller volume than the low pressure cylinder, where it is further compressed in the presence of fuel. Sufficient fuel is employed to produce a very rich mixture with the air/fuel ratio being on the order of 8:1 to 13:1. This fuel/air mixture in the high pressure cylinder is combusted and expanded and the resulting gases are thereafter exhausted into a reservoir chamber. The pressure of these exhausted gases is approximately the same as the pressure to which the air remaining in the low pressure cylinder is compressed. From the reservoir chamber, the exhausted gases are introduced into the low pressure cylinder beginning at about the end of its compression stroke to mix with the compressed air in that cylinder. This mixture is combusted after which the resulting product gases are expanded and then exhausted to atmosphere. The aforementioned steps are repeated.

The energy obtained from each combustion is harnessed to, e.g., drive a vehicle, and to perform the process steps. The low and high pressure cylinders are interconnected in a manner similar to conventional internal combustion engines so that the piston strokes in each of the cylinders are coordinated as desired. Of course, multiples of this basic number of cylinders may be employed in tandem.

Several advantages are obtained from the herein-described process. The primary advantage is that both hydrocarbons and nitrogen oxide pollutants are reduced, as is carbon monoxide. A further important advantage is that work is obtained from each of the cylinders to thereby improve the overall engine thermal efficiency.

DESCRIPTION OF THE DRAWINGS

FIG. 1 is a flow diagram which schematically illustrates the steps of this invention;

FIG. 2 is a series of representational, cross-sectional views of a low pressure cylinder of this invention showing varying piston positions and effects thereof;

FIG. 3 is a series of representational, cross-sectional views of a high pressure cylinder of this invention showing varying piston positions and effects thereof in relation to the low pressure cylinder of FIG. 2.

DESCRIPTION OF THE PREFERRED EMBODIMENT

In general, the dual combustion process of this invention comprises: inducting air into a low pressure zone; compressing that air, but withdrawing a fraction of the air from the low pressure zone after compression is initiated but before maximum compression is reached; passing the withdrawn air into a high pressure zone where it is mixed with fuel to provide a very rich mixture and further compressed; combusting this fuel-air mixture; and withdrawing the resulting exhaust gases, after expansion, from the high pressure zone and returning them to the low pressure zone where they are mixed and further combusted with the compressed air in the latter zone. Exhaust gases from the latter combustion are purged from the low pressure zone and the afore-described steps are repeated. With each combustion, expansion is produced which is harnessed as work to both conduct the steps of this process and to provide work for external use, e.g., to move a vehicle.

Interconnection of the low pressure (l.p.) and high pressure (h.p.) zones (or cylinders) is highly flexible because, after warm-up, steady-state conditions prevail. That is, gases which are removed from one zone for induction into the other zone may be temporarily stored in intermediate chambers so that they are always available when needed for use in the other zone. On the other hand, such gases may be flowed from one zone into the other zone essentially without being stored between the zones. Thus, the relative timing between zones or cylinders may vary from being in phase to being any number of degrees out of phase. However, in practice, it will be desirable to employ zone phase relationships which minimize engine vibration.

This invention, as depicted in FIG. 1 and as described herein with reference thereto, is described as though the l.p. and h.p. zones were approximately 180° out of phase with each other. On the other hand, this invention, as depicted in FIG. 2 and FIG. 3, and as described herein with reference thereto, is described as though the l.p. and h.p. zones were substantially in phase with each other.

More specifically, and with reference to FIG. 1, the process of this invention is initiated by inducting air into a first or low pressure zone 10 through an air inlet port 12 which may be opened and closed by an inlet valve 14. The air prior to induction into the low pressure zone 10 is normally at ambient temperature and pressure although it is contemplated that it could be compressed prior to entering this zone 10 such as by employing a "blower" or "supercharger," as is well known.

After the desired amount of air is drawn into the low pressure zone 10, the inlet valve 14 closes and the inducted air is compressed. However, after compression is initiated but before the maximum pressure is reached in the low pressure zone 10, compressed air transfer valve 16, which is closed up to this point, opens to permit a portion of the air to flow from the low pressure zone 10 into a compressed air transfer conduit 18 through a compressed air transfer port 17. After a predetermined amount of air has escaped from the low pressure zone 10 into the compressed air transfer conduit 18, the compressed air transfer valve 16 closes and compression of the air remaining in the low pressure zone 10 continues until the desired maximum pressure in this zone is obtained. Meanwhile, the compressed air escaping into the air transfer conduit 18 is drawn through the latter and into a high pressure zone 20.

Prior to entering the high pressure zone 20, the compressed air is preferably sent through a heat exchanger or intercooler 22 particularly, if the high pressure zone utilizes spark ignition, e.g., an Otto cycle, to cool the compressed air which has been heated by the work performed on it during its compression in the low pressure zone 10. The compressed air is cooled to, e.g., 140° F., although both lower and higher temperature air may be inducted into the high pressure cylinder 20 as is well known. At air temperatures substantially above 140° F., the efficiency of the combustion process in the high pressure zone 20 decreases markedly because of the need to use lower compression ratios to avoid knocking in the high pressure zone 20, whereas air temperatures substantially below 140° F. are difficult to attain without excessively large intercoolers 22 and/or other bulky and expensive air conditioners.

On the other hand, if the high pressure zone combustion reaction employs compression ignition, e.g., a Diesel engine, no cooling of the compressed air necessarily need take place. This is because high temperatures are needed to ignite the fuel.

After the high pressure zone 20 is substantially filled with air, a compressed air inlet valve 24 which regulates the opening of an air inlet port 26 through which the high pressure zone 20 is in communication with the compressed air transfer conduit 18, moves to its closed position. The air in the high pressure zone 20 is then further compressed. If the high pressure zone 20 utilizes spark ignition, fuel is introduced into that zone prior to the compression stroke, e.g., usually together with the air as shown in FIG. 1, and the fuel is compressed together with the air. However, if the high pressure zone 20 uses compression ignition, fuel is injected into the zone 20 near the end of the compression stroke. Regardless of which cycle is used, the amount of fuel used in the h.p. zone 20 is that which will provide a highly fuel-rich air/fuel mixture.

After the compression stroke is completed, the air/fuel mixture in the high pressure zone 20 is combusted (using spark or compression ignition). The resulting gaseous products of combustion expand and, in so doing, perform work which is harnessed as hereafter described. Prior to total expansion of the gaseous products, a high pressure exhaust valve 28 opens to permit the gases to exhaust through an exhaust port 30 and into a high pressure exhaust conduit 32. After the combustion gases have been substantially exhausted from the high pressure zone 20 (following exhaust stroke), the exhaust valve 28 closes and the inlet valve 24 opens to begin a new cycle.

The exhaust gases from the high pressure zone 20 next flow into a collection chamber 34 which functions as a reservoir for the high pressure zone exhaust gases until they are introduced into the low pressure zone intake. It is to be understood that, in some cases, the exhaust conduit 32 could itself function as the reservoir. From the collection chamber 34, the exhaust gases return to the high pressure exhaust conduit 32 for introduction into the low pressure zone 10 through an exhaust gas inlet port 36 which is opened and closed by an exhaust gas injection valve 38. The latter opens at approximately the completion of the compression step in the low pressure zone to permit the high pressure exhaust gases in the collection chamber 34 (from the preceding high pressure zone cycle) to mix with the compressed air in the low pressure zone 10. In order for this mixing to occur, the exhaust gases from the high pressure zone 20 are at substantially the same, although slightly higher, pressure when they enter the low pressure zone 10 as is the compressed air at the end of the low pressure zone compression step.

The air and high pressure exhaust gas mixture in the low pressure zone 10 may ignite with or without a spark or glow assist regardless of the type of ignition used in the high pressure zone. In any event, combustion of this mixture occurs with expansion of the resulting product gases. Again, work is performed by the expanding gases with this work being harnessed as described hereafter. Towards the end of the combustion step, at a predetermined point in the expansion cycle, the exhaust gas injection valve 38 in the low pressure zone 10 will close, but the exhaust valve 28 at the high pressure zone 20 will remain open so that high pressure exhaust gases will continue to exhaust from the high pressure zone 20 into the collection chamber 34 during the high pressure exhaust stroke which purges the exhaust gases from the high pressure zone 20 prior to induction of compressed air from the low pressure zone 10 into the high pressure zone 20.

Near the completion of the expansion of the combustion gases in the low pressure zone 10, a low pressure exhaust valve 37 opens to permit those gases to be exhausted from the low pressure zone 10 through a low pressure exhaust port 39 during the low pressure exhaust stroke. The low pressure exhaust valve 37 then closes and the air inlet valve 14 opens to initiate a new cycle.

The parameters affecting the herein-described dual combustion process will now be discussed. As previously described, the compressed air transfer valve 16 opens before the end of the compression stroke to permit compressed air to flow from the low pressure zone 10 through the compressed air transfer conduit 18. The amount of air transferred from the low pressure zone 10 to the high pressure zone 20 is governed by the air/fuel ratio in each of the low pressure and high pressure zones. As to the air/fuel ratio in the high pressure zone 20, if too little air (relative to the amount of fuel) is introduced into the high pressure zone 20, the air/fuel mixture therein will be too rich with attendant failure of that mixture to ignite. On the other hand, if the amount of compressed air transferred to the high pressure zone 20 is too great, combustion in the low pressure zone 10 may fail to occur or to sustain itself because of the resulting lower gas temperature in that zone due to the reduced combustibles in the high pressure zone exhaust gases. Nitrogen oxide emissions from the low pressure zone 10 would also be disproportionately high.

More specifically, it is necessary to use a fuel-rich mixture in the high pressure zone 20 to produce a low nitric oxide concentration and to provide combustibles in the form of carbon monoxide, hydrogen and hydrocarbons for use in the low pressure zone 10. The minimum air/fuel ratio in the high pressure zone 20 is generally governed by the lower flammability limit of the fuel. For gasoline, this is about 8:1. The maximum air/fuel ratio in the high pressure zone 20 is about 13:1 since above about this ratio, the formation of oxide of nitrogen increases exponentially. By comparison, conventional internal combustion engines employ air/fuel ratios of about 16:1 for cruising.

As to the air/fuel ratio in the low pressure zone 10, an excess amount of air must be retained therein in order to carry out combustion to completion in that zone 10. This means that, in practice, an air/fuel ratio of at least about 16:1 (providing about 6 percent excess air) is required in the low pressure zone 10. At air/fuel ratios below about 16:1, there will be incomplete combustion in the low pressure zone 10 with resulting high carbon monoxide and hydrocarbon exhaust emissions. On the other hand, if very high excesses of air are employed in the low pressure zone 10, e.g., air/fuel ratios on the order of 30:1, it becomes very difficult to initiate and sustain combustion in the latter zone with the result usually being incomplete combustion. A practical upper air/fuel limit in the low pressure zone 10 is about 20:1.

In practice, the amount of air transferred to the high pressure zone 20 from the low pressure zone 10 will be about 40 percent to about 80 percent (preferred about 50 percent to about 60 percent) of the total amount of air inducted into the latter zone. The amount of air to be transferred is readily calculated from the air/fuel ratios selected for the low pressure and high pressure zones 10, 20. For example, if the air/fuel ratios are to be 17:1 and 9:1 for the low pressure and high pressure zones 10, 20, respectively, then the amount of air to be transferred is (9/17) 100 = 53%.

The pressure of the transferred air is limited by several factors. These include the maximum allowable pressure in the high pressure zone 20, the compression ratio in the low pressure zone, and the thermal efficiency of the process. It is desirable to employ the maximum pressure possible in the high pressure zone 20 to increase thermal efficiency. This pressure is limited by the knock characteristics of the fuel and/or by the stress characteristics of the engine members. After the pressure to be used in the high pressure zone 20 is determined, the transferred air pressure and high pressure zone compression ratio are selected to give the best overall thermal efficiency. For example, a high transferred air pressure and a correspondingly low compression ratio, and vice versa, may be used. In selecting the high pressure zone compression ratio, it must be kept in mind that the latter must be high enough to provide sufficient expansion cooling of the high pressure zone exhaust gases so that the combustion temperature in the low pressure zone 10 is low enough to prevent formation of excessive amounts of nitric oxides.

In practice, the pressure of the transferred air will be between about 1.5 atmospheres and about 6 atmospheres. That is, the compressed air transfer valve 16 will open and close between about 1.5 and about 6 atmospheres.

After the air transfer valve 16 closes, the air remaining in the low pressure zone 10 is further compressed. The final air pressure is adjusted to be less than and, preferably, substantially equal to the pressure of the gases exhausted from the high pressure zone 20 at the end of its power stroke. In practice, this will be between about 3 and about 15 atmospheres depending upon the compression ratio in the high pressure zone 20.

After the compressed air is transferred to the high pressure zone 20 (with or without passing through an intercooler 22 as described), it is mixed with fuel as previously described. The fuel is any fuel presently used in conventional internal combustion engines, i.e., gasoline. Sufficient fuel must be injected into the high pressure zone 20 to provide a very rich air/fuel mixture to ensure minimum specific nitric oxide emissions as described.

The ratio of the volumetric displacement (the ration of the difference between the inducted and compressed air volumes in each zone) of the low pressure and high pressure zones 10, 20 is a function of the amount of compressed air which is transferred from the low pressure zone 10 to the high pressure zone 20. The high pressure zone volumetric displacement must be substantially less than that of the low pressure zone. Typical volumetric ratios fall between about 1:3 and about 1:12.

The compression ratio used in the high pressure zone is preferably the highest possible to maximize overall efficiency. High ratios will not lead to significant increases in nitrogen oxide production because of the excessively fuel-rich mixtures employed in the high pressure zone 20. The particular compression ratio employed will depend upon the knock-limited performance of the high pressure zone 20 and the knock-rating of the fuel. In any case, it will be above about 3:1 and preferably about 4:1 to about 10:1.

After the compression and exhaust operations have occurred in the high pressure zone 20, the exhaust gases are flowed into the low pressure zone 10 through the collection chamber 34. The latter is sized so that, inter alia, after all the combustion product gases have been exhausted from the high pressure zone 20, the maximum pressure in the collection chamber 34 is greater than, but preferably substantially equal to, the pressure in the low pressure zone 10 at the end of its compression step (or at the beginning of its combustion step) and is approximately equal to the pressure in the high pressure zone at the end of its expansion stroke.

The average collection chamber pressure is selected, in conjunction with the other parameters described herein, to maximize engine thermal efficiency. The desired average collection chamber pressure is achieved primarily by selecting the gas injection valve timing and low pressure zone compression ratio.

This invention will now be further described with reference to FIGS. 2 and 3 in which there are shown low and high pressure cylinders 40, 70, respectively, which are of conventional construction. No valves or inlet or exhaust ports are shown in these figures for simplicity. However, these components are also of conventional design. The valves are interconnected using conventional techniques to ensure that the desired flow of gases into and between the cylinders 40, 70 takes place.

The overall cycle starts with ambient air 42 being drawn into a low pressure cylinder 40 as a piston 44 within the latter moves toward its maximum volume position (usually bottom dead center — B.D.C.) as shown by the arrow 46 (FIG. 2A). After the low pressure piston 44 has reached its maximum volume position, the air inlet valve 14 closes and the piston 44 begins its compression stroke (FIG. 2B) as it moves towards top dead center (T.D.C.) as shown by the arrow 48. Before the low pressure piston reaches its T.D.C. position, the compressed air transfer valve 16 opens (and closes) to permit the required amount of compressed air 50 to flow from the low pressure cylinder 40 and into the high pressure cylinder 70 (directly or indirectly through the intercooler 22). After the air transfer valve 16 closes, the low pressure piston 44 further compresses the air 52 remaining in the low pressure cylinder 40 until it reaches its T.D.C. position (shown in dotted outline in FIG. 2B).

Commencing near the start of the return of the low pressure piston 44 to its B.D.C. position as indicated by the arrow 54 in FIG. 2C, the exhaust gas injection valve 38 in the low pressure cylinder 40 opens to permit exhaust gases from the high pressure cylinder 70 to flow into the low pressure cylinder 40 (via the gas collection chamber 34) from a previous high pressure cycle as shown by dotted line 84.

The compressed air 50 transferred to the high pressure cylinder 70 enters the latter past the open compressed air inlet valve 24 as a piston 72 in the high pressure cylinder 70 moves to its B.D.C. position as shown by the arrow 74 (FIG. 3A). Thereafter, the inlet valve 24 closes and the high pressure piston 72 begins its compression stroke (FIG. 3B) as shown by the arrow 76 to further compress the air 50. The fuel is injected into the high pressure cylinder 70 with the air 50 or during or after compression of the latter. The primary combustion then occurs in the high pressure cylinder 70 with expansion of the resulting combustion gases 78 to thereby produce work, part of which is used to drive the piston 72 back to its B.D.C. position (FIG. 3C) as shown by the arrow 80.

Before the high pressure piston 72 reaches B.D.C., the high pressure exhaust valve 28, which has been closed until now, opens to permit the exhaust gases 78 to begin exiting from the high pressure cylinder 70 for flow into the collection chamber 34. At about the same time, or later depending upon the phasing between the low and high pressure cylinders, the exhaust gas injection valve 38 in the low pressure cylinder 40 opens to permit the high pressure exhaust gases 78 (from a previous high pressure cycle) to flow from the collection chamber 34 into the low pressure cylinder 40 to mix with the compressed air 52 in the latter. Secondary combustion in the low pressure cylinder 40 may take place at any time after this mixing, but preferably takes place as early in the low pressure expansion as possible.

Following initiation of the exhausting of the combustion gases 78 from the high pressure cylinder 70, the high pressure piston 72 ocntinues its movement to its B.D.C. position (FIG. 3C) after which it moves to its T.D.C. position (FIG. 3D) as shown by the arrow 82 to complete the purging of the exhaust gases 78 from the high pressure cylinder 70. At the end of the latter purging stroke, the high pressure exhaust valve 28 closes and the compressed air inlet valve 24 opens to permit induction of more compressed air into the high pressure cylinder 70 as depicted in FIG. 3A.

Meanwhile, after initiation of the combustion of the compressed air 52 and high pressure exhaust gases 78 mixture in the low pressure cylinder 40, the low pressure piston 44 travels towards its B.D.C. position and, when it has reached a position about 60° to 90° after its T.D.C. position (when combustion of the mixture is complete), the exhaust gas injection valve 38 closes with the low pressure combustion gases 56 continuing to expand during the remainder (if any) of this stroke. Again, the expansion of the low pressure combustion gases 56 creates work part of which is used to drive the pistons 44, 72. More specifically, the injection valve 38 closes when the low pressure cylinder volume reaches a volume obtained by calculating the volume occupied by the low pressure combustion gases at the high pressure exhaust pressure and combustion temperature.

After the low pressure cylinder piston 44 reaches B.D.C., it reverses its direction as shown by the arrow 58 (FIG. 2D) and the low pressure exhaust valve 37 opens. The piston 44 then moves to its T.D.C. position to thereby purge the combustion gases 56 from the low pressure cylinder. The low pressure exhaust valve 37 closes after the purging stroke is completed and the air inlet valve 14 opens to permit more ambient air to be drawn into the low pressure cylinder 40 as the low pressure cycle is repeated.

The low and high pressure pistons 44, 72 are interconnected by, for example, connecting them to the same crankshaft or connecting them to separate crankshafts which, in turn, are rigidly geared or connected together. The exact phasing between the low pressure and high pressure pistons is not critical to the operation of the engine since the intercooler 22 and exhaust collection chamber 34 serve to store the compressed air and exhaust gases until they are needed in the high pressure and low pressure cylinders 40, 70. The volume of the intercooler 22 and the collection chamber 34 are preferably sufficiently large to damp the pulsations in the gas flows, but as small as possible consistent with the above requirement to provide rapid acceleration and deceleration of the engine.

From the foregoing, it will be understood that nitrogen oxides, hydrocarbons, and carbon monoxide are reduced by twice combusting the fuel under a different set of conditions for each combustion. Primary combustion takes place at high pressures with a very fuel-rich mixture, whereas secondary combustion takes place in the presence of excess air at relatively low pressures and at relatively low temperature, (less than about 1,800° K). The formation of nitrogen oxides is reduced in the high pressure combustion by the use of the fuel-rich mixture and in the low pressure zone by the use of relatively low temperatures at which the kinetic rates of formation of the nitrogen oxides is slow so that the combustion time is substantially less than the time required to form significant amounts of nitrogen oxides. Hydrocarbons and carbon monoxide are substantially reduced in the low pressure zone due to the excess air used therein.

It is also within the scope of this invention to use fuel in the low pressure cylinder 40 when starting the engine because of the initial thermal inertia of the system. It is also contemplated that, instead of removing some of the air from the low pressure cylinder 40 for induction into the high pressure cylinder 70, a blower be employed to compress ambient air and inject it into the high pressure cylinder 70. This latter dual induction technique is not preferred, however, since it adds additional, expensive equipment in place of the line 18 and intercooler 22 and creates additional problems of coordination between low pressure and high pressure cylinders since there is no automatic air control as with the previously described single induction technique.

While this invention has been described in connection with a four-stroke engine, it may also be used in connection with a two-stroke cylinder. In this case, the latter functions at low pressure as the low pressure cylinder. However, two high pressure, four-stroke cylinders are needed in conjunction with each two-stroke cylinder. Except for its two-stroke operation, the latter cylinder operates in this invention as previously described for the four-stroke, low pressure cylinder 40. Additionally, the two high pressure, four-stroke cylinders operate as previously described except that they function 180° out of phase with each other so that they alternately feed exhaust gases to the two-stroke cylinder.

If a suitable nitric oxide reduction catalyst is available, it may be used in the exhaust collection chamber 34 to further reduce the nitric oxide concentration.

I claim:

1. An internal combustion process in an internal combustion engine having first and second expansible combustion chambers operative to apply power to the engine output member comprising the steps of:
    inducting air into a first said chamber;
    compressing said air in said first chamber to a first pressure;
    inducting air into a second said chamber;
    compressing said air in said second chamber to a second pressure substantially greater than said first pressure;
    injecting fuel into said second chamber in an amount sufficient to provide an air/fuel mixture in which the amount of said fuel is substantially in excess of the stoichiometric amount for complete combustion by said air;
    combusting said air/fuel mixture in said second chamber to provide a first expansion of the combustion gases;
    exhausting said combustion gases from said second chamber;
    flowing said combustion gases into said first chamber at a pressure initially at least equal to said first pressure to mix with said compressed air to provide an air/fuel mixture in which said air is in excess of the stoichiometric amount of air required for complete combustion of said fuel;
    combusting the mixture of said compressed air and said combustion gases in said first chamber to produce a second expansion;
    exhausting the expanded combustion gases resulting from the combustion in said first chamber from said first chamber; and
    repeating said steps.

2. The process of claim 1 in which a portion of said compressed air in said first chamber is withdrawn from said first chamber at a third pressure which is less than said first pressure prior to said air being compressed to said first pressure in said first chamber and wherein said portion of said compressed air is inducted into said second chamber to provide the air in said second chamber.

3. The process of claim 1 in which air is inducted independently into said first and said second chamber.

4. An internal combustion process comprising the steps of:
    inducting air into a first chamber;
    compressing said air in said first chamber to a first pressure;
    withdrawing a portion of said compressed air from said first chamber at a third pressure which is less than said first pressure prior to said air being compressed to said first pressure in said first chamber;
    inducting said portion of said compressed air into said second chamber to provide the air in said second chamber;
    compressing said air in said second chamber to a second pressure substantially greater than said first pressure;
    injecting fuel into said second chamber in an amount sufficient to provide an air/fuel mixture in which the amount of said fuel is substantially in excess of the stoichiometric amount for complete combustion by said air;
    combusting said air/fuel mixture in said second chamber to provide a first expansion of the combustion gases;
    exhausting said combustion gases from said second chamber;
    flowing said combustion gases into said first chamber at a pressure initially at least equal to said first pressure to mix with said compressed air to provide an air/fuel mixture in which said air is in excess of the stoichiometric amount of air required for complete combustion of said fuel;
    combusting the mixture of said compressed air and said combustion gases in said first chamber to produce a second expansion;
    exhausting the expanded combustion gases resulting from the combustion in said first chamber from said first chamber; and
    repeating said steps.

5. The process of claim 4 in which the air/fuel ratio in said second chamber is between about 8:1 and about 13:1.

6. The process of claim 5 in which the air/fuel ratio in said first chamber is at least about 16:1.

7. The process of claim 5 in which the air/fuel ratio in said first chamber is between about 16:1 and about 20:1.

8. The process of claim 4 in which the volumetric displacement of said second chamber is substantially less than the volumetric displacement of said first chamber.

9. The process of claim 8 in which the ratio of said volumetric displacement in said second chamber to said volumetric displacement in said first chamber is between about 1:3 and about 1:12.

10. The process of claim 4 in which the compression ratio in said first chamber is between about 3:1 and about 15:1.

11. The process of claim 10 in which the compression ratio in said second chamber is at least about 3:1.

12. The process of claim 11 in which said portion of said compressed air is withdrawn from said first chamber at said third pressure between about 1.5 atmospheres and about 6 atmospheres.

13. The process of claim 12 in which said portion of said compressed air comprises between about 50% and about 60 percent of the total amount of air inducted into said first chamber.

14. The process of claim 4 in which said portion of said compressed air is substantially cooled before being inducted into said second chamber and said combustion in said second chamber is initiated by spark ignition.

15. The process of claim 4 in which said combustion gases from said second chamber are exhausted into a reservoir zone before being flowed into said first chamber.

16. An internal combustion process which comprises the steps of:
- inducting air into a first combustion chamber;
- compressing said air in said first combustion chamber to a first pressure between about 3 atmospheres and about 15 atmospheres;
- withdrawing a portion of the compressed air from said first combustion chamber at a second pressure lower than said first pressure before said air is compressed to said first pressure;
- inducting said portion of said compressed air into a second combustion chamber;
- compressing said compressed air in said second combustion chamber to provide a compression ratio in said second chamber of at least about 3:1, the ratio of the volumetric displacement in said second chamber to that of said first chamber being between about 1:3 and about 1:12;
- introducing fuel into said second combustion chamber to provide an air/fuel ratio in said second chamber between about 8:1 and about 13:1;
- combusting said compressed air and said fuel in said second combustion chamber to produce a first expansion of the resulting combustion gases;
- exhausting said combustion gases from said second combustion chamber;
- inducting said combustion gases into said first combustion chamber at a pressure substantially equal to but greater than said first pressure to mix with said compressed air at substantially said first pressure and to provide an air/fuel ratio of at least about 16:1;
- combusting said combustion gases and said air in said first combustion chamber to produce a second expansion of the combustion products;
- exhausting said combustion products from said first combustion chamber; and
- repeating the foregoing steps.

17. The process of claim 16 in which said second pressure of the withdrawn air is between about 1.5 atmospheres and about 6 atmospheres.

18. The process of claim 17 in which said portion of said compressed air comprises about 50 percent to about 60 percent of the total amount of said air inducted into said first combustion chamber.

19. The process of claim 16 in which said air/fuel ratio in said first combustion chamber is between about 16:1 and about 20:1.

20. The process of claim 19 in which said compression ratio in said second combustion chamber is between about 4:1 and about 10:1.

21. The process of claim 16 which comprises the further steps of
- cooling said portion of said compressed air to a temperature substantially below the temperature of said portion when withdrawn from said first combustion chamber before inducting said portion into said second combustion chamber;
- and wherein said combusting in said second combustion chamber is produced by spark ignition of said fuel and air.

22. The process of claim 21 wherein said combustion gases are exhausted from said second combustion chamber into a reservoir chamber before induction into said first combustion chamber.

* * * * *